(No Model.)

F. M. PIPER.
LACING STUD.

No. 290,800. Patented Dec. 25, 1883.

Witnesses.
Robert Wallace,
L. N. Möller.

Inventor.
Francis M. Piper
by Wm A. Macleod
his atty

UNITED STATES PATENT OFFICE.

FRANCIS M. PIPER, OF LYNN, MASSACHUSETTS.

LACING-STUD.

SPECIFICATION forming part of Letters Patent No. 290,800, dated December 25, 1883.

Application filed July 7, 1883. (No model.)

*To all whom it may concern:*

Be it known that I, FRANCIS M. PIPER, of Lynn, county of Essex, and State of Massachusetts, have invented a new and useful Improvement in Lacing-Studs, of which the following is a full, clear, concise, and exact description, reference being had to the drawings accompanying and forming a part hereof, in which—

Figure 1:
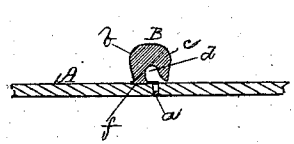
Figure 3:
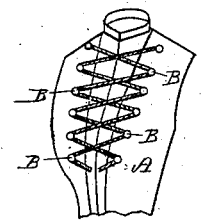
Figure 2:
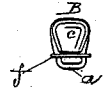

Figure 1 is a sectional view of the stud attached to a piece of cloth. Fig. 2 is a front elevation. Fig. 3 is a part of a dress-front, showing the manner of using the stud.

My device is very simple, and will be readily understood from the following description, in which letters of reference are used to the accompanying drawings.

A represents the cloth or material, to which the stud B is attached by stitches passing through the eye $a$. In the drawings this method of fastening is shown, although, as will be obvious, the manner of fastening is not essential. The body $b$ of the stud may be of any convenient shape, although I prefer to make it round or oblong. The lip $c$ may be joined to the body or may be integral with it, and extends downward, so that the end of the lip is on a level with the base of the stud, thus causing the material (if it be flexible) to which the stud is attached to close the entrance to the mouth $d$, which holds the lace sufficiently to prevent the lace from slipping the stud, while at the same time it is no serious obstacle to unlacing. This construction also prevents the mouth of the stud from catching in any light open material of ladies' wear—such as lace—and tearing it. If the stud is desired for use on hard or comparatively inflexible material—such as hard leather—the lip $c$ will not extend downward so far, but will allow space between it and the material to which the stud is attached to allow the lace to enter without bending or depressing the material. The eye $a$ is so set on the base of the stud that the flat portion $f$ of the base lies on the side of the eye from which the strain of the lace comes. In other words, the eye $a$ is on that side of the base of the stud toward the lip $c$ or the entrance to the mouth $d$, and is inside of the point of said lip, or nearer to the shank of the stud than said point. As the strain tends to pull the stud over, it is prevented from doing so by the flat portion $f$, which bears upon the material to which the stud is attached, thus giving it stiffness proportionate to the inflexibility of the material.

What I claim is—

A lacing-stud having a downwardly-projecting lip or hook, and a shank provided with a flattened base extended toward the point of the hook, and having an eye arranged on the side of said base toward said hook and inside of the point of the same, substantially as described.

FRANCIS M. PIPER.

Witnesses:
   WM. A. MACLEOD,
   ROBERT WALLACE.